United States Patent [19]
Haas

[11] 3,920,852
[45] Nov. 18, 1975

[54] READY-TO-EAT CEREAL CONTAINING DEBITTERED SOY PRODUCTS

[75] Inventor: Gerhard J. Haas, Woodcliff Lake, N.J.

[73] Assignee: General Foods Corporation, White Plains, N.Y.

[22] Filed: July 9, 1973

[21] Appl. No.: 377,230

Related U.S. Application Data

[63] Continuation of Ser. No. 202,690, Nov. 26, 1971, abandoned, which is a continuation of Ser. No. 827,047, May 22, 1969, abandoned.

[52] U.S. Cl. .................. 426/62; 426/534; 426/621; 426/640; 426/656
[51] Int. Cl. ............................................. A23l 1/18
[58] Field of Search ........... 426/141, 142, 208, 212, 426/346, 351, 62

[56] References Cited
UNITED STATES PATENTS

| | | | |
|---|---|---|---|
| 2,421,216 | 5/1947 | Penty | 426/351 |
| 2,930,700 | 3/1960 | Bradof | 426/46 |
| 3,682,647 | 8/1972 | Bedenk | 426/141 |

OTHER PUBLICATIONS

Altschul, Aaron "Processed Plant Protein Foodstuffs" Academic Press New York 1958, p. 413.

*Primary Examiner*—Raymond N. Jones
*Attorney, Agent, or Firm*—Cameron, Kerkam, Sutton, Stowell & Stowell

[57] ABSTRACT

The palatability of breakfast cereals containing soy products is improved by mixing dried inactive yeast and malt with the soy.

8 Claims, No Drawings

READY-TO-EAT CEREAL CONTAINING DEBITTERED SOY PRODUCTS

This is a continuation, of application Ser. No. 202,690, filed Nov. 26, 1971, which is in turn a continuation of Ser. No. 827,047, filed May 22, 1969, both now abandoned.

BACKGROUND OF THE INVENTION

1. Field of the Invention

This invention relates to debittering soy products and particularly to reducing or eliminating the undesirable bitter or beany flavor of soy.

2. Description of the Prior Art

Soy is one of the least expensive sources of food grade vegetable protein. Soy flour, soy protein isolates, soy grits, soy flakes, soy meal, and the like have long been incorporated into foods such as ready-to-eat and other breakfast cereals, bread formulations, cake flour, soup and gravy mixes, cookie, pancake, doughnut and waffle mixes, meat loaf and the like.

Unfortunately the amount of soy that can be incorporated into a given food is limited by the natural soybean flavor that may be characterized as bitter or beany.

There have been many attempts to reduce the beany flavor of soy materials such as by heating soybeans either dry or with steam or adding materials to the beans. While some are effective to some extent, further improvement is desirable.

SUMMARY OF THE INVENTION

The purpose of this invention is to produce a pleasant tasting soy concentrate and soy containing foodstuff of reduced beaniness or bitterness by incorporating dried inactive yeast with the soy or soy containing foodstuff.

DESCRIPTION OF THE INVENTION

The bitter and beany flavor of soy containing food is reduced by incorporating dried, inactive yeast with the soy product.

The soy being treated may include raw, cooked or debittered soybeans, soy grits, soy flakes, soy meal, soy flour, soy protein isolates and concentrates, and the like. The soy may be defatted or not. The soy may also be incorporated with other foodstuffs and the dried, inactive yeast then added to reduce the soy beaniness. Typical soy containing foodstuffs that may be treated by the process of this invention may include cereal grains such as corn, rice, wheat, oats, barley and the like; vegetables; fruits; minerals; fats; sugars; starches; beef, pork, fowl, fish, and meat byproducts, mixtures of one or more of these and similar materials employed as raw ingredients in foodstuffs containing soy.

The supplement of this invention is particularly useful in ready-to-eat and other breakfast cereals.

Dried, inactive yeast is added directly to the soy to prepare a flavorful supplement or is added to the food product containing the soy. The manner of addition is not critical.

In preparing cereal products it is preferred to heat the cereal formulation after addition of soy and dried, inactive yeast such as by cooking, baking, toasting or combinations thereof well known in the cereal field. Heating insures the development of optimum flavor.

The dried, inactive yeast may be any commercially available products such as yeast flakes, Torula yeast or Saccharomyces fragilis or equivalent which has been dried and inactivated with heat. The yeast may be characterized as having a slight tan color and a yeasty aroma.

The quantity of dried, inactive yeast that is mixed with the soy may be regulated to give mixtures having various degrees of flavor and protein value. Up to 50% by weight dried, inactive yeast by weight of soy may be employed although 0.05–25% is normally sufficient to reduce the beany-bitter flavor of the soy. It is preferred to employ from 3% to 20% dried, inactive yeast by weight of soy.

Soy may be employed at a level of 0.5% to 30% of the food with 1% to 25% of concentrated soy preferred for breakfast cereal formulations. For use as an ingredient in breads, biscuits, rolls, cookies, cakes, doughnuts, pancakes, soup bases, gravy bases or meat extracts up to 30% soy may be used.

The following examples are illustrative of the products and processes of this invention but are not intended to limit the invention.

EXAMPLE 1

To 100 grams of Promine D in a quart jar is added 25 g. of torula yeast flour. The jar is rotated by hand for about two minutes until a uniform blend is obtained; the degree of blend readily determined by appearance.

When 20 g., 10 g. and 5 g. of dried, inactive yeast is added to 100 g. of Promine D, as above, there is obtained uniform blends suitable for incorportion in food.

EXAMPLE 2

100 g. of toasted soy flakes is moistened with 20 g. water by spraying the flakes arranged in a thin layer with a fine mist of water vapor. 15 g. of dried, inactive yeast flour is dusted onto the flakes and the entire mixture tumbled for one minute. The mixture is then dried and oven toasted.

EXAMPLE 3

To 200 g. defatted soy meal in a mixing bowl is added 20 g. of dried, inactive yeast flour. The blend is mixed for ten minutes, packaged in a polyethylene bag and stored for use in a food fortified by soy.

The yeast flour is prepared by grinding dry Saccharomyces fragilis or equivalent yeast in a Fitzpatrick mill to a fine powder.

EXAMPLE 4

A dry blend of 217.6 g. rice flour, 64 g. corn flour, 12.3 g wheat gluten, 7.9 g. wheat germ, 44 g. Promine D soy and a mixture of 3.1 g. dry Torula yeast and 5 g. primary yeast flakes is prepared in a Hobart mixer.

A wet mix containing 30.3 g. sucrose, 9.5 g. sodium chloride and 26 g. conventional malt syrup (regular malt water extract) is prepared and added to the dry mix gradually with 124 g. of distilled water so that a uniform distribution of liquid is obtained. The mixture is extruded through a metal die into cereal ropes and then autoclaved at 15 psig for 20 minutes. The cereal ropes are then cut and pressed into flakes. The flakes are dried to a crisp texture at 66° C. and toasted at 176° C. to a golden color.

When 16 g. of Munich malt or caramel malt is used to replace the 5 g of yeast flakes there is obtained an equally palatable debittered cereal.

EXAMPLE 5

A dry mix is prepared as in Example 4 except that the Promine D and dried, inactive yeast (Torula and the flakes) is replaced by 60 g. of the supplement prepared as Example 1 containing 50 g. Promine D and 10 g. of dried yeast (Saccharomyces fragilis). After moistening, the mix is treated as in Example 4 to prepare a debittered cereal.

Example 6
A dry mix is prepared as in Example 4 by blending:

| Ingredient | Grams |
| --- | --- |
| Corn Flour | 117.2 |
| Regular Malt Syrup | 8.9 |
| Sucrose | 3.7 |
| Salt | 3.7 |
| Soya Fluff | 14.8 |
| Torula Yeast | 1.5 |

To this mix is added 44 ml. of water and the mixture is processed as in Example 4 to give a palatable debittered cereal.

When this example is repeated employing 15 g. Promine D for the Soya Fluff there is obtained an equally palatable cereal. Soya Fluff (soy flour) and Promine D (soy isolate) are manufactured by Central Soya Company.

What is claimed is:

1. A ready-to-eat breakfast cereal containing a cereal grain, at least 0.5% to 30% of a soy protein source selected from the group consisting of soy flour, soy concentrate and soy isolate, an inactive yeast and malt, and wherein the concentration of yeast and malt based on the dry weight of soy is in an amount sufficient to reduce the beany-bitter flavor of the soy to give a palatable cereal.

2. The ready-to-eat breakfast cereal of claim 1 wherein the cereal grain is selected from the group consisting of corn, wheat, oats, rice, barley and mixtures thereof.

3. The ready-to-eat breakfast cereal of claim 2 wherein the soy protein source is soy isolate.

4. The ready-to-eat breakfast cereal of claim 1 wherein 0.05% to 25% by weight dried, inactive yeast is employed by weight of soy.

5. The ready-to-eat breakfast cereal of claim 1 wherein the malt is selected from the group consisting of Munich malt and caramel malt.

6. The ready-to-eat breakfast cereal as set forth in claim 1 wherein the yeast is selected from the group consisting of Torula yeast, Saccharomyces fragilis, primary yeast flakes and mixtures thereof.

7. The ready-to-eat breakfast cereal of claim 6 wherein the cereal grain is corn.

8. The ready-to-eat breakfast cereal of claim 1 wherein the concentration of yeast ranges from 3% to 20% by weight of the soy.

* * * * *